United States Patent [19]

Linkous

[11] 3,821,602
[45] June 28, 1974

[54] THERMALLY PROTECTABLE MULTISPEED MOTOR

[75] Inventor: Clovis E. Linkous, Fort Wayne, Ind.

[73] Assignee: General Electric Company, Fort Wayne, Ind.

[22] Filed: Nov. 20, 1972

[21] Appl. No.: 308,180

[52] U.S. Cl. ............. 317/13 B, 310/68 C, 310/198
[51] Int. Cl. .............................................. H02h 7/08
[58] Field of Search .......... 310/198, 203, 204, 205, 310/206, 207, 184, 68 C; 317/13 B

[56] References Cited
UNITED STATES PATENTS

| | | | |
|---|---|---|---|
| 1,987,725 | 1/1935 | Veinott | 317/13 B |
| 2,735,974 | 2/1956 | Capps | 318/476 X |
| 2,808,554 | 10/1957 | Capps | 310/198 X |
| 2,854,596 | 9/1958 | Weixelman et al. | 310/198 |

Primary Examiner—James D. Trammell

[57] ABSTRACT

Multispeed single phase induction motor has plural main winding sections and an auxiliary winding arranged in distributed coil groups on a slotted magnetizable core. Single thermal protector connected in series with all of main winding sections; one end of auxiliary winding connected with thermal protector and high speed main winding section. Conductor extends from the other end of auxiliary winding to a point accessible from motor exterior. Other conductors extend to be accessible from motor exterior for selective connection to power source. The polar axis of each auxiliary coil group is displaced a predetermined angle B (measured in electrical degrees) from a next adjacent main winding coil group polar axis. Motors embodying invention have improved low speed starting torque; less output torque pulsation; less heat loss; less power input requirements; better efficiency; and that require less operating current for any given speed — all while using less winding conductor than heretofore. In some designs, smaller capacitor for the auxiliary winding can be used than heretofore in motors optimized for same given application.

10 Claims, 3 Drawing Figures

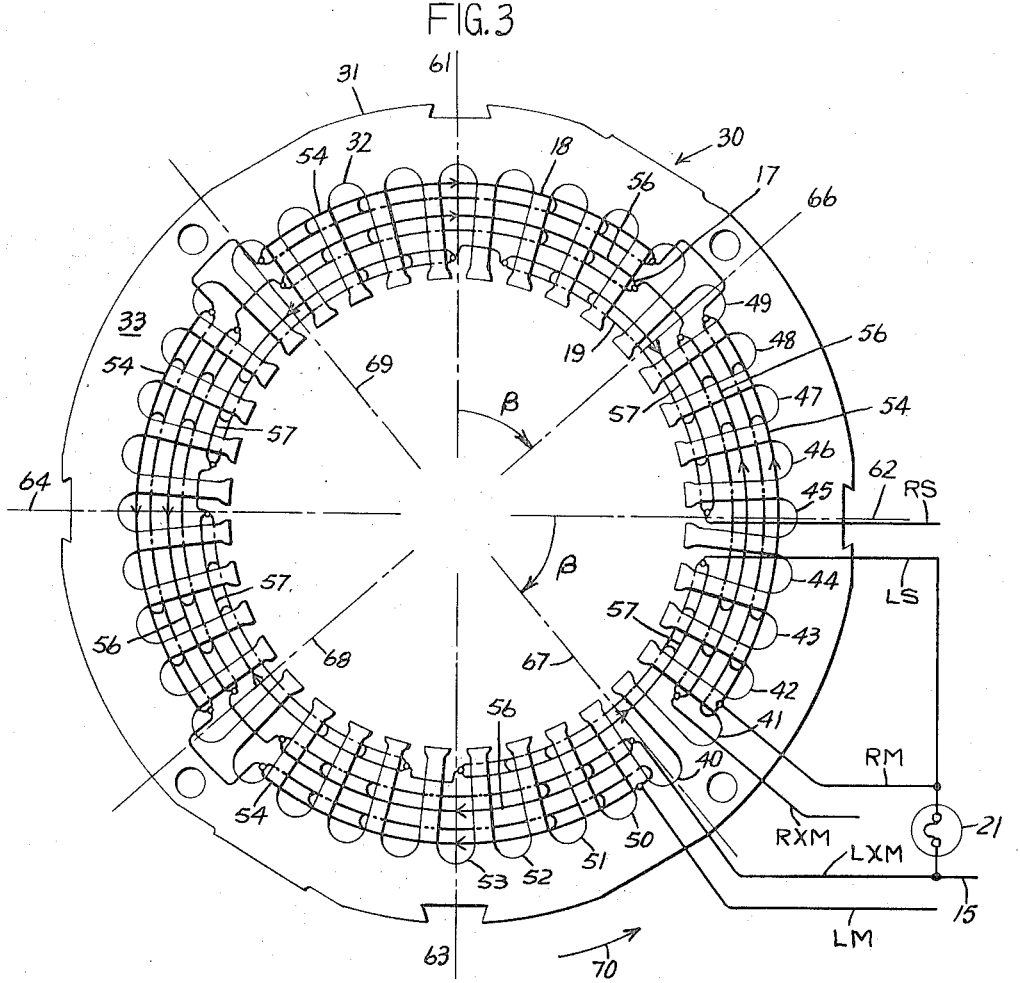

THERMALLY PROTECTABLE MULTISPEED MOTOR

BACKGROUND OF THE INVENTION

This invention relates to dynamoelectric machines and, more particularly, to improved multispeed single phase alternating current induction motors of the type having series connected main winding sections, an auxiliary winding section that may be series connected with a capacitor at least during motor starting intervals, and having a winding arrangement such that a single thermal protector may be used to protect each of the main and auxiliary winding sections while they are energized.

Capps U.S. Pat. No. 2,735,974 (assigned to the assignee of this application) teaches an approach for solving the problem of providing only a single thermal protector for each of a plurality of series connected main winding sections, as well as an auxiliary winding section, of multispeed induction motors that have winding arrangements which facilitate serially connecting the auxiliary winding section with an external capacitor. The Capps approach has been long utilized by the assignee of this application and, apparently, has been also utilized for some time by others in the industry.

While the Capps approach is a noteworthy one, certain application limitations have been found where, for one reason or another, there are restrictions regarding the maximum capacitance of the external capacitor that is to be connected to the auxiliary winding. For example, economic considerations may require that a relatively low capacitance capacitor be used (and therefore, other things being equal, a relatively inexpensive capacitor). This relatively low capacitance then becomes a design restraint that must be recognized and accepted by designers and manufacturers of motors.

By way of a more specific example, plural section capacitors having a common terminal or lead can represent a design restraint with respect to capacitor value for economic reasons, and also with respect to motor winding configurations and winding termination arrangements. For instance, a prospective motor purchaser may request a thermally protected multispeed permanent capacitor motor having: a "common" lead that is to be connected to the common or neutral termination of a dual section capacitor package; an auxiliary winding lead that is to be connected to one side of a relatively small value capacitor section of the dual capacitor package; and two or more leads that may be selectively connected (e.g., by a switch) to a voltage source so as to selectively cause multispeed motor operation.

While the above mentioned Capps approach has been satisfactory for many specific applications of each of the just mentioned exemplary situations; there have been cases where it has been difficult (if possible at all) to provide motors that would exhibit acceptable levels of starting torque when initially energized while switched for low speed operation, i.e., when started with the extended or "extra" main winding section or sections energized. It has been especially difficult to devise motors having satisfactory levels of low speed starting torque and satisfactory levels of high speed operating current particularly in those cases where a relatively great difference in high and low operating speeds is requested. A relatively great difference exists, for example, when the ratio of the high speed torque to low speed torque is in the neighborhood of 4.5:1 or greater.

Thus, it would be desirable to provide new and improved motors of the above described multispeed type that would fulfill the need for utilizing the desirable approaches known heretofore (e.g., those which permit use of a single thermal protector), even in those applications that demand a wide range between high and low operating speeds. It would be even more desirable to provide such motors that would fulfill the need for winding and termination arrangements such that a "common" motor lead and auxiliary winding lead will be provided for connection with the terminations of a plural section capacitor.

SUMMARY OF THE INVENTION

Accordingly, at least two objects of the present invention are to provide new and improved thermally protectable multispeed motors that fulfill the just mentioned needs.

These and other objects may be carried out by providing motors with winding and termination arrangements as are described in detail herein. Moreover, embodiments of the present invention, in addition to accomplishing these objects, can provide surprising and additional advantages.

For example, by the application of teachings presented herein to previously designed motors, motors embodying the present invention can now be built that have (as compared to such "previous" designs) improved low speed starting torque; less output torque pulsation (and therefore less noise) at operating speeds; less heat loss; less power input requirements; better efficiency; and that require less operating current for any given speed. What is especially surprising is that this all may now be accomplished while using less winding conductor than heretofore. In addition, and even more surprising, all of these just mentioned improvements may be attained for at least some designs while using a smaller capacitor for the auxiliary winding than would be required for a prior art motor that had been optimized for the same given application.

In providing the above mentioned features and objects, a multispeed single phase induction motor is constructed with a plurality of main winding sections and an auxiliary winding arranged in distributed coil groups on a slotted magnetizable stator core. The auxiliary winding and at least one main winding section are connected in parallel and all of the main winding sections are connected in series. A single thermal protector is connectable or connected in series with all of the main winding sections and one end of the auxiliary winding is connected in circuit with the juncture of the thermal protector and that section of the main winding that is to be energized during high speed operation. A conductor extends from the other end of the auxiliary winding to the exterior of the motor. Other conductors extend to the exterior of the motor that may be selectively connected to a power source for multispeed motor operation. The coil groups are arranged to establish any desired number of poles that each in turn have a polar axis. The polar axis of each auxiliary coil group is displaced a predetermined angle $\beta$ (measured in electrical degrees) from a next adjacent main winding coil group polar axis.

BRIEF DESCRIPTION OF THE DRAWINGS

FIG. 3 is an end view of a stator assembly of a motor embodying the invention and provided with a winding arrangement generally represented by FIG. 2.

DESCRIPTION OF PREFERRED EMBODIMENTS

Figure 2:
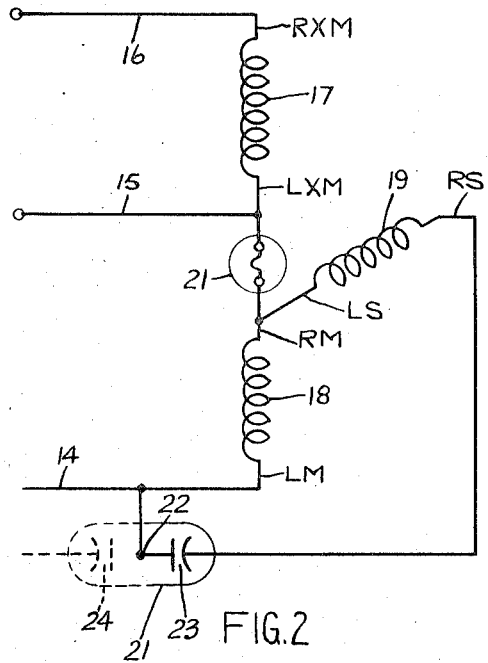
FIG. 2 is a schematic representation of a stator winding circuit for a motor embodying the invention.
Figure 1:
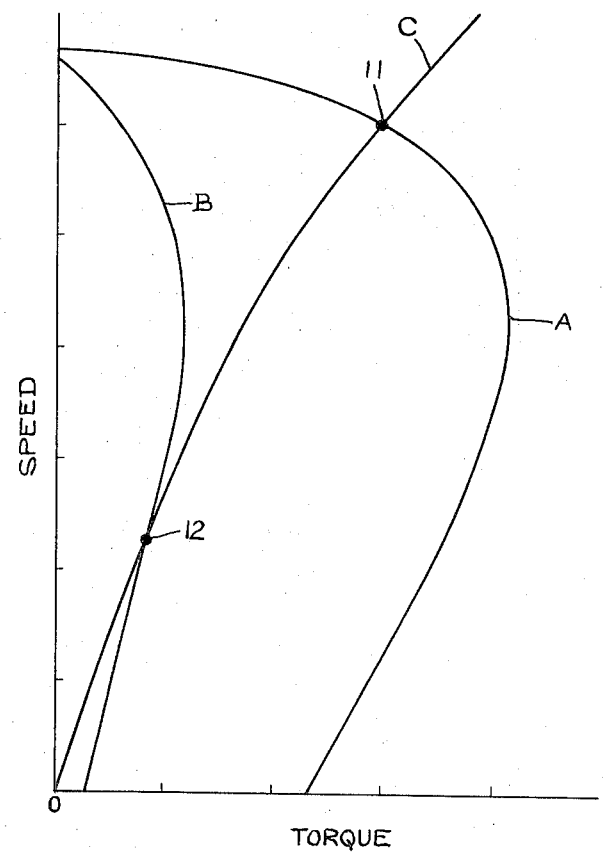
FIG. 1 is a plot of speed versus torque for motors of the type described herein and for a load device such as a fan.

Turning first to FIGS. 1 and 2, it will be understood that operation of motors having serially connected distributed wound winding sections at different speeds is accomplished by selectively energizing different ones of the winding sections. This in turn varies the number of volts applied per winding turn and thus varies the output torque produced at any given speed.

The curves A and B represent the speed-torque curves for operation of such a motor at "high" and "low" speeds respectively. The curve C, on the other hand, represents a speed-torque curve for a load device, such as a fan.

It will be observed that increased amounts of torque would be required to drive the typified fan at increased speeds. It also will be observed that the points of intersection 11 and 12 of curve C with curves A and B would establish the two operating speeds for a two-speed motor having speed-torque curves similar to curves A and B, when driving a fan characterized by curve C.

Although the curves of FIG. 1 are not intended to be representative of any particular motor and fan, they are here presented to give an indication of what is meant by "low" or "high" speed motor operation and to also indicate the relationship of such operating conditions to selective energization of multiple main winding sections.

Turning now to FIG. 2, high speed operation of the motor represented by FIG. 2 would occur when leads 14 and 15 are connected to a suitable power source; whereas low speed operation would occur when leads 16 and 14 are connected to the power source. Of course, operation at one or more intermediate speeds may also be accomplished by providing connection leads that tap the main winding section 17 at a point or points between the ends thereof.

The circuit of FIG. 2 schematically illustrates the present invention as embodied in one preferred form. More specifically, a main winding of any desired number of poles is formed of multiple winding sections 17 and 18. The section 18 is the "main" or high speed section of the main winding, and section 17 is an "extra main" or "extended main" winding section. The auxiliary winding in FIG. 2 is represented by winding section 19. The coil groups of this winding are physically placed on the stator core so that the polar axes of the auxiliary winding 19 are displaced an angle of more than 90 electrical degrees (in a direction opposite to the direction of rotor rotation) relative the polar axes of the main winding section 18.

FIG. 2 also shows one of the preferred locations of a single thermal protector 21 which protects each of the illustrated winding sections.

A two section capacitor 21 also is shown to illustrate the interconnection of a common capacitor termination 22 with conductor LM of main winding section 18, and capacitance 23 with the conductor RS of auxiliary winding section 19.

It should be understood that a simple or single section capacitor (as shown, e.g., in the above referenced Capps patent) could be used in lieu of the capacitor 21. However, it has become a relatively frequent practice in the industry to use two section capacitors as shown in FIG. 2 with a second capacitance section 24 connected in circuit with the auxiliary winding of a second motor. Since the section 24 would be of use in connection with a motor not represented by FIG. 2, capacitor section 24 has been illustrated with phantom lines.

Typically, when a multispeed motor represented by FIG. 2 is to be used to drive a fan (for example, in an air conditioner); capacitor section 24 will be used in conjunction with a compressor motor. One arrangement of a fan and compressor motor for an air-conditioning system is shown in Chang U.S. Pat. No. Re.24,499. Compressor motors and parts thereof per se, including so called "shifted windings" for such motors are described in more detail in Hoffmeyer U.S. Pat. No. 3,633,056 and Smith U.S. Pat. No. 3,062,978, both of which are assigned to the assignee of this application.

With reference to FIG. 3, several parts of the exemplified motor have been omitted in the interest of brevity. However, it will be understood that actual embodiments of the invention will include a rotor assembly (e.g., a short-circuited squirrel cage rotor body and shaft); bearing means for the rotor assembly; a stator housing or shell; and end frames or shields for locating and supporting the bearing means. These each are of any desired suitable construction and may be as shown, for example, in Seely U.S. Pat. No. 3,270,223, the entire disclosure of which is incorporated herein by reference.

The stator member 31 of motor 30 includes a magnetizable core 33 made up of a stack of iron or mild steel laminations as will be understood. The core is provided with a plurality of winding accommodating slots 32, a total of 36 such slots being utilized for core 33. This assembly also includes main and auxiliary winding sections, a thermal protector, and winding termination conductors, all of which are designated (to the extent possible) by the same reference numerals as the corresponding part of member shown in FIG. 2.

In order to avoid duplication and confusion in FIG. 3, the reference numerals 17, 18, and 19 have each been applied to only one coil group in each of the main, extended main, and auxiliary winding sections, although each section is in fact made up of four coil groups in motor 30. A complete description of the winding arrangement of the motor 30 will now be presented for purposes of exemplification, it being understood that variations may be made in wire size or material, number of turns per coil, and number of coils per coil group, and coil group locations for different applications. To simplify the following detailed description, reference numerals 41 through 49 sequentially identify adjacent ones of a group of slots associated with the coil group of one main winding pole. Some of these same slots also accommodate side turn portions of auxiliary winding coil groups. However, a complete description of one coil group for the four pole auxiliary winding will be presented with reference to slots 40 through 44 and 50 through 53.

The main winding section 18 comprises four substantially identical coil groups 54. Each coil group 54 is formed of three coils as shown in FIG. 3 that are formed of 0.0213 inch diameter enameled copper conductor. The number of winding turns in the innermost to outermost coils of each coil group were, respectively 44, 61, and 68. Thus, the side portions of 44 turns of main winding were received in slots 43 and 47; of 61 turns in slots 42 and 48; and of 68 turns in slots 41 and 49.

The extended section 17 of the main winding was formed of four substantially identical coil groups 56 and each of these coil groups were formed with (counting from innermost coil to the outermost coil) 24, 33, and 38 turns, respectively, of 0.0142 inch diameter enameled copper wire.

The auxiliary winding section 19 includes four substantially identical coil groups 57 which were located, relative to the coil groups 54 and 56 as shown in FIG. 3. From innermost to outermost, the coils in these groups contained 132, 180, and 204 turns, respectively. Thus 132 auxiliary winding side turn portions were accommodated in slots 42 and 51; 180 side turn portions in slots 43 and 52; and 204 side turn portions in slots 44 and 53. The auxiliary winding material was 0.0134 inch diameter enameled copper wire.

With the winding arrangement shown, the conductors RS, RXM, and LM will extend to the exterior of the motor 30 to permit connection with switching means, voltage power supply means, and capacitor means all as has been explained previously in connection with the description of FIG. 2, assuming that a connection arrangement as shown in FIG. 2 is to be used.

Preferably, the thermal protector 21 will be located in proximity to the windings of the motor 30 so as to protect such windings from overheating as will be understood. In some applications, it may be necessary to mount the protector to a portion of the stator housing as will also be understood by persons skilled in the art.

The placing of the coil groups 54, 56, and 57 in the manner shown in FIG. 3 provides a four pole motor with four radial polar axes 61, 62, 63 and 64 established by the main winding coil groups. Similarly, the auxiliary winding coil groups establish four radial polar axes 66, 67, 68, and 69 about which corresponding ones of the auxiliary winding coil groups are symetrically distributed. The relative direction of positive convention current flow through each of the coil groups in FIG. 3 has been indicated by an arrowhead superposed on each of such coil groups. In addition, the direction of rotation for the rotor of motor 30 (when looking into FIG. 3) has been indicated by the arrow 70. The main and auxiliary winding coil groups have been placed in the slots of core 33 so that each of the auxiliary polar axes is located a predetermined angle Beta ($\beta$) (as measured in a direction opposite to the direction of rotation) from the main winding polar axis adjacent thereto. This predetermined angle has been indicated in FIG. 3 and is selected to be greater than 90 electrical degrees. In the case of motor 30, angle Beta was equal to 100 electrical degrees (or 50 mechanical degrees). It will be understood however, that the angle Beta may be as much as 130 electrical degrees for some applications. In addition, depending upon, among other things, the number of slots in the core the angle Beta may be somewhat less than 100 but still more than 90 electrical degrees.

Motors were constructed and tested to compare the characteristics of motor 30 and a motor optimized for the same application but constructed as taught in the above referenced Capps patent and in which the angle Beta was 90 electrical degrees. The prior art type motor main winding coil groups (which would correspond to coil groups 54 in FIG. 3) were made up of, from innermost to outermost coils respectively, 45-61-69 turns of 0.0269 inch diameter copper wire. The "extended" main winding coil groups occupied the same slots as the just mentioned main winding coil groups and were formed of 0.0134 inch diameter copper wire. The innermost to outermost coils of these coil groups comprised 23, 31, and 35 turns respectively. The auxiliary winding was formed of 0.0106 inch diameter copper wire and included a total of four coil groups. Two of these coil groups comprised four coils each that were formed by, from innermost to outermost coil respectively, 113, 173, 212, and 226 winding turns. The other two auxiliary winding coil groups were formed of three coils each that comprised, from innermost to outermost coils, 113, 173, and 212 turns, respectively.

The total amount of copper conductor in the motor constructed according to Capps' teaching was about 1.67 pounds; whereas only about 1.55 pounds of copper conductor material was used in motor 30. This represents an important cost savings feature referred to hereinabove. However, and even more importantly, the starting torque of motor 30 (when energized for low speed operation at 1,000 rpm) was 1.1 ounce feet whereas only 0.92 ounce feet of starting torque was measured for the Capps' type motor when it was started while connected for low speed (i.e., 1,000 rpm) operation. Both of these motors were operated and tested with a 3.5 microfarad capacitor.

The ratio of watts output per volt ampere input of the motor 30 was 0.475 whereas for the Capps type motor, the ratio of watts output per volt ampere input was only 0.445. These ratios are a measure, on a per unit basis, of the current draw of each of the motors and were calculated from test data obtained during high speed operation, i.e., at 1,550 rpm.

The efficiency of the motor 30 and other motor, respectively, was 51 and 47.9 percent, respectively, at 1,550 rpm; and the current drawn at 1,550 rpm by motor 30 and the other motor, respectively, was 2.1 amps and 2.34 amps, respectively. It should now be apparent that the motor 30 was superior in substantially every respect as compared to the other motor, and yet less winding material was used in motor 30.

Because these just stated results were surprising, calculations were made to better determine the magnitude of the advantages that could be obtained because of the present invention. These calculations indicate that, at least for some designs, motors embodying the invention not only have operating characteristics that are better in substantially all respects, but also provide these advantages when used with a capacitor having a smaller capacitance as compared to motors optimized according only to prior teachings. As an example of this, two optimized three speed motors were designed. The first of these motors was designed as taught herein with an angle Beta of 110°; while the second motor was optimized with an angle Beta of 90°. At a speed of 1,540 rpm and a torque output of 8.3 ounce feet for each motor, the total current input would be 1.94 amps and 2.26 amps, respectively, for the first and second motors, and the efficiency would be 52.7 and 46.5 percent, respectively.

With regard to watts input and watts loss, the first motor would have 216 watts input and 102 watts loss; whereas the second motor would have 244 watts input and 131 watts loss. The torque pulsation ratio (expressed as the ratio of the single amplitude AC torque to the average torque output) would be a desirable 0.37 for the first motor as compared to a not as desirable 1.10 for the second motor. Even more importantly, low speed starting torque for the first motor was 1.0 ounce feet as compared to 0.90 ounce feet for the second motor.

In addition to all of the above, the first motor would need only about 1.4 pounds of copper winding conductor material whereas the second motor would require about 1.6 pounds of copper winding conductor; and the first motor could be operated with a 3.5 microfarad capacitor whereas the second motor would need a 5 microfarad capacitor for operation. The rated voltage for all of the capacitors referred to hereinabove, e.g., 370 volts, was not exceeded. Also, all of the motors specifically discussed and compared herein were designed for 115 volt, 60 Hz operation.

Although the above description is directed primarily to pointing out advantages associated with relationships between the arrangement of auxiliary windings vis-a-vis main winding sections; it is also noted that other advantages can result from arranging the coil groups of an extended main winding section relative to the high speed main winding coil groups so that three different sets of radial polar axes are established. These three sets would include the two sets discussed at length hereinabove, and a third set established by the extended main winding section; with individual axes of the third set displaced a predetermined angle Gamma or number of electrical degrees from the axes associated with the primary or high speed main winding section 18 in a motor. When angle Gamma is other than 0° (it being noted that Gamma is zero in the illustrated embodiments), and Beta is selected as described above; particular benefits associated with low speed starting torque improvements may result for 230 volt applications, among other things.

It also should be specifically noted that all of the above advantages can be realized when motor windings, as represented in FIG. 2, are interconnected by connecting lead RS to lead LM rather than lead RM to LS. Then, lead LS would be connected through a capacitor to, e.g., the juncture of leads LXM and RM or to lead RXM; all assuming, of course, that the restraints associated with using a dual section capacitor were not present. A single thermal protector could still then be used for all of the winding sections, by connecting it between lead 14 and the juncture of leads or conductors RS and LM.

From the foregoing, the magnitude of the advantages accruing from utilization of the invention as taught herein should now be appreciated. Thus, while I have shown and described what at present are considered to be preferred embodiments of the invention in accordance with the Patent Statutes, changes may be made in the embodiments described hereinabove without actually departing from the true spirit and scope of the invention. I therefor intend to cover in the following claims all such equivalent variations as fall within the invention.

What I claim as new and desire to secure by Letters Patent of the United States is:

1. A multispeed single phase induction motor having a magnetizable core having winding accommodating regions, a plurality of main winding sections connected together in series relation, at least one auxiliary winding section connected at a first side thereof to a first side of one of the main winding sections, a thermal protector connected to the first side of the auxiliary winding section, and circuit means connecting the thermal protector in series with said at least one auxiliary winding section and all of said main winding sections; said main winding sections being arranged on the magnetizable core to establish a set of at least two main winding polar axes and said at least one auxiliary winding section being arranged on the magnetizable core to establish a set of at least two auxiliary winding polar axes each displaced a predetermined angle in excess of 90 electrical degrees from a main winding polar axis next adjacent thereto.

2. The motor of claim 1 wherein the main and auxiliary winding sections each comprise at least one coil group comprising a plurality of winding turns distributed along the winding accommodating regions of the core.

3. The motor of claim 1 further including a conductor extending from a second side of the auxiliary winding section to a point accessible from outside the motor and adapted to be connected through a capacitor to a power source.

4. A multispeed induction motor having a stator assembly and rotor assembly; said stator assembly comprising: a magnetizable core; a main winding including a plurality of main winding sections; an auxiliary winding; and circuit means permitting the connection of a thermal protector in series circuit relation with the auxiliary winding and each of the main winding sections and a series circuit relationship of all of said main winding sections; said auxiliary winding being positioned on the core to establish at least one auxiliary polar axis and having first and second auxiliary winding ends, with the first auxiliary winding end being connected to a first end of a first main winding section and the second auxiliary winding end connected to a conductor extending to a point accessible from outside the motor and adapted to be connected to one side of a capacitor; said main winding being positioned on the core to establish at least one main winding polar axis adjacent to the at least one auxiliary winding polar axis and spaced therefrom more than 90 electrical degrees, said main winding having the second end of the first main winding section connected to a conductor extending to a point accessible from outside the motor and adapted to be connected to a source of power.

5. The motor of claim 4 further including at least first and second leads connected to the first and second ends of a second main winding section and extending to a point accessible outside the motor and adapted to be selectively connected to a power source; and wherein the thermal protector is disposed within the motor and connected between the first main winding section and the second main winding section.

6. The motor of claim 5 wherein the auxiliary winding and main winding sections comprise distributed winding turns.

7. A multispeed induction motor having a magnetizable core with a plurality of slots therein, a main winding including an extended main winding section arranged in distributed coil groups on the core, an auxiliary winding arranged in distributed coil groups on the core and having a first side thereof connected to the main winding between the ends thereof, and a single thermal protector connected in series with the auxiliary and main windings; said main winding coil groups being positioned on the core to establish at least two main winding radial polar axes, and said auxiliary winding coil groups being positioned on the core to establish an auxiliary winding radial polar axis adjacent to one of the at least two main winding radial polar axes and spaced therefrom an arcuate distance in excess of 90 electrical degrees.

8. The motor of claim 7 wherein the auxiliary winding is connected at the second side thereof to a conductor extending to a point accessible from the exterior of the motor, and the single thermal protector is connected between the extended main winding section and the first side of the auxiliary winding.

9. In a multispeed induction motor having a magnetizable core, a distributed wound main winding, including an extended main winding section, placed on the core and defining at least two main winding polar axes, and at least three conductors extending to a point accessible from the exterior of the motor; the improvement comprising: a distributed wound auxiliary winding placed on the core and positioned relative to the main winding to establish at least two auxiliary winding polar axes each displaced more than 90 electrical degrees from the main winding polar axis next adjacent thereto, a first end of said auxiliary winding being connected to one of said at least three conductors.

10. The invention set forth in claim 9 wherein a second end of said auxiliary winding is connected to the main winding between the ends thereof, and said motor further comprises a thermal protector connected in series with both the auxiliary winding and the main winding.

* * * * *